UNITED STATES PATENT OFFICE.

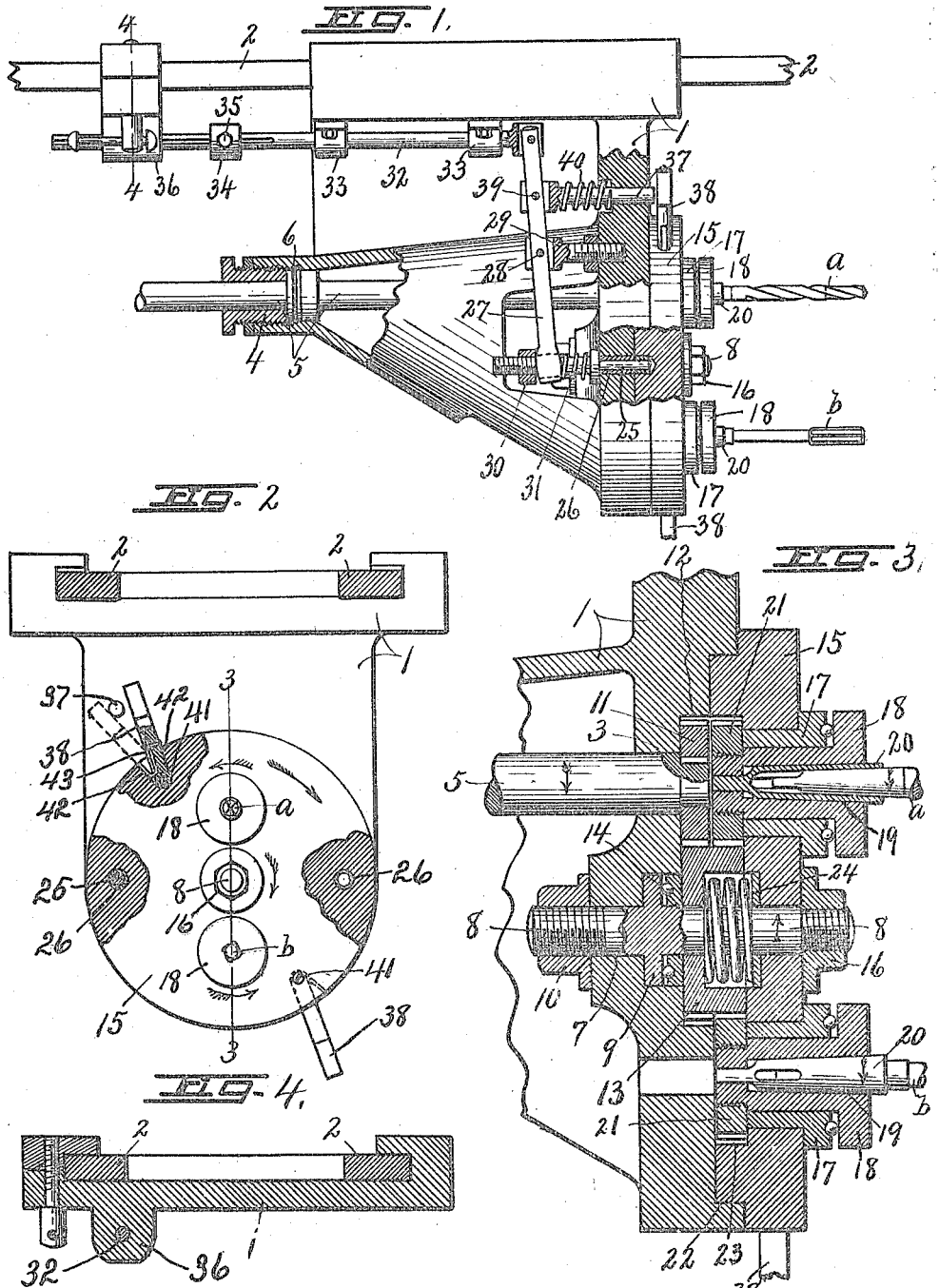

WILLIAM H. TAMBS, OF SYRACUSE, NEW YORK.

COMBINED DRILLING AND REAMING MACHINE.

1,248,750.  Specification of Letters Patent.  Patented Dec. 4, 1917.

Application filed June 18, 1917. Serial No. 175,469.

*To all whom it may concern:*

Be it known that I, WILLIAM H. TAMBS, a citizen of the United States of America, and resident of Syracuse, in the county of Onondaga, in the State of New York, have invented new and useful Improvements in Combined Drilling and Reaming Machines, of which the following, taken in connection with the accompanying drawings, is a full, clear, and exact description.

This invention relates to certain improvements in combined drilling and reaming machines, preferably of the automatic multiple-head type in which each tool-supporting head is mechanically reciprocated to and from the work to cause the tool or tools to perform the necessary operation thereon, in combination with suitable means coöperating with the head for alternately interchanging the positions of the tools for successive operation upon the same part of the work.

In the usual type of machine for drilling purposes only, it is customary to use a gig with guide bushings therein which have to be removed when the drills are replaced by reamers for properly sizing the previously drilled holes, and one of the objects of my present invention is to obviate the necessity for removing these guide bushings.

A further object is to render this interchange of position of the tools, such for example as a drill and reamer, entirely automatic so that the drilling and reaming operations may be performed mechanically and successively without attention on the part of the operator and without removing or replacing the tools.

Other objects and uses relating to specific parts of the machine will be brought out in the following description.

In the drawings—

Figure 1 is a side elevation, partly in section, of one of the reciprocating tool-carrying heads and guide therefor, together with the means for rotating the tool chucks, and means for interchanging their positions.

Fig. 2 is an end face view, partly in section, of the parts shown in Fig. 1.

Fig. 3 is an enlarged sectional view taken on line 3—3, Fig. 2.

Fig. 4 is a detail sectional view taken on line 4—4, Fig. 1.

The mechanism shown is a part of a quadruple drill press, commonly used for simultaneously drilling the four holes of a differential gear case for receiving the supporting spindles for the pinions, and comprises a head —1— adapted to be reciprocated by any suitable operating means, not necessary to herein illustrate or describe, along a guide-way —2—, said head being provided with co-axial bearings —3— and —4— parallel with and some distance to one side of the guide-way —2— in which is journaled a shaft —5— adapted to be rotated by any suitable driving means, not shown.

The bearing —4— preferably consists of a threaded bushing screwing into one end of the head to take up the wear of an end-thrust bearing —6— and also to resist the endwise movement of the shaft in one direction.

The opposite end of the head in which the bearing —3— is formed is provided with an opening —7— parallel with and some distance to one side of the shaft —5— for receiving one end of a stationary threaded spindle —8— which is rigidly clamped in place by means of an annular shoulder —9— and a nut —10— engaging the head at opposite ends of the opening —7—.

A pinion —11— is keyed or otherwise secured to the end of the shaft —5— to rotate in a recess —12— in the outer face of the head close to the corresponding end of the bearing —3— and meshes with an idler gear —13— which is loosely mounted on the stationary spindle —8— in the same recess —12— so as to be rotated continuously by the pinion —11—.

An end-thrust bearing —14— is interposed between the collar —9— and adjacent face of the gear —13— to reduce friction between those parts.

The spindle —8— extends through and some distance beyond the front face of the head and upon it is journaled a relatively large circular disk —15— which is held in place by a nut —16— engaging the outer threaded end of the spindle —8—, but may be removed at any time by simply removing the nut —16—.

This disk is provided with a pair of diametrically opposite bearings —17— parallel with and equal distances from the axis of the spindle —8— corresponding to the distance between said axis and that of the shaft —5— for receiving and supporting a pair of rotary tool-carrying chucks, each consisting of a bushing —18— having an axially tapered opening —19— and a hollow tapered sleeve —20— fitted in its tapered opening, one of the sleeves serving to receive and hold a drill, as —a—, while the other sleeve is adapted to receive and hold a reamer —b—.

The inner ends of the bushings —18— are preferably reduced and threaded, and upon these threaded ends are screwed internally threaded pinions —21— both of the same size as the pinion —11—, and mesh with diametrically opposite sides of the idler gear —13— which is of sufficient face width to engage both gears —11— and —21— end to end, the pinions —21— being disposed in the same plane of rotation at the outer end of the pinion —11—.

The outer end face of the head —1— is provided with a relatively large circular recess —22— for receiving the adjacent reduced end of the disk —15— which is also provided with a recess —23— in its inner face to receive the pinions —21— and adjacent end of the idler —13—, thus permitting the disk with the pinions —21— thereon to turn freely about the axis of the spindle —8—.

The adjacent faces of the disk —15— and idler gear —13— are recessed to receive a coil spring —24— around the spindle —8—, said spring being tensioned to produce sufficient friction between those parts to cause the rotation of the disk by and in the same direction as the idler gear when the disk is released by its locking means, presently described.

This locking means consists of a sliding bolt —25— movable parallel with the axis of the spindle —8— in an opening in the head —1— and into and out of one or the other of a pair of diametrically opposite sockets —26— in the inner face of the disk —15—.

A lever —27— is pivoted at —28— intermediate its ends to a stud —29— on the head —1— and has one end connected by a nut —30— and coil spring —31— to the locking bolt —25— and its other end connected to a reciprocatory operating rod —32— which is slidably mounted in suitable bearings —33— on the head —1— parallel with the guide —2—.

This operating rod —32— is provided with a collar —34— adjustable lengthwise thereof and held in place by a set screw —35— to coöperate with a limiting stop —36— on the guide —2—.

A stop pin —37— is slidable endwise in an opening in the head —1— into and out of the path of one or the other of a pair of diametrically opposite shoulders —38— projecting from the periphery of the disk —15— and is pivotally connected at —39— to the lever —27— between the pivot —28— and point of connection of said lever with the operating rod —32—.

It is, therefore, apparent that the locking bolt —25— and stop pin —37— are connected to the lever —27— at opposite sides of the pivot —28— so that when the lever is rocked in one direction, it will withdraw the bolt —25— from its locking position and force the locking pin —37— into the path of movement of one of the shoulders —38— and vice versa will force the locking bolt to its locking position and simultaneously withdraw the locking pin.

The lever —27— is operated in one direction by a retracting spring —40— surrounding the stop pin —37— between the head of said pin and adjacent face of the head —1—, said spring —40— being somewhat stiffer than the spring —31— so as to withdraw the pin —37— out of the path of the shoulders —38— and simultaneously force the locking pin —25— to its locking position for holding the disk —15— against rotation during the drilling or reaming operation which is accomplished by the forward movement of the head —1— by any suitable mechanism, not shown.

The collar —34— is adjusted so that when the head carrying the rod —32— is drawn back sufficiently to withdraw the tools —a— and —b— from the work, the collar —34— will engage the limiting stop —36— before the head reaches the end of its return movement, thereby operating the lever —27— to withdraw the locking bolt —25— from its locking position and simultaneously force the stop pin —37— into the path of movement of the shoulders —38—, whereupon the friction produced by the spring —24— will cause the continuously rotating idler gear —13— to rotate the disk —15—, thereby interchanging position of the tools —a— and —b—, as for example when it is desired to ream the hole previously made by the drill —a—.

The shoulders —38— have a slight circumferential movement relatively to the disk —15— and are preferably pivoted at —41— to said disk to move between opposed shoulders —42— against the action of retracting springs —43—, one for each shoulder.

The object of this slight circumferential movement of the stop shoulders —38— is to permit them to take a position ahead of the locking pin —37— when said pin is withdrawn and the disk is locked by the bolt —25— so that when the bolt is withdrawn and the locking pin is forced to its holding position, the disk will be free to make substantially a half revolution until the next shoulder —38— encounters the locking pin and is forced to the limit of its movement against the action of a retracting spring —43—, whereupon the further rotation of the disk is stopped in such position as to enable the locking bolt —25— to enter the alined socket —26— in said disk as the locking pin —37— is withdrawn.

This interchange of positions of the tools —a— and —b— is repeated at each cycle of forward and return movement of the head —1—.

That is, the head is first advanced to drill the hole in the work and then returned from the work, whereupon the disk is rotated substantially a half turn to interchange the position of the reamer and drill so that during the next cycle of movement of the head, the reamer will be forced into and out of the work to perform its function.

What I claim is:

1. In a combined drilling and reaming device, the combination of a reciprocatory head, a rotary member mounted on the head, a drill support and a reamer support, both mounted on the rotary member equal distances from the axis thereof, means for rotating said supports relatively to the rotary member, and automatic means controlled by the reciprocatory movement of the head for locking and releasing the rotary member.

2. In a combined drilling and reaming device, the combination of a reciprocatory head, a rotary member mounted on the head, a drill support and a reamer support, both mounted on the rotary member equal distances from the axis thereof, means for rotating said supports relatively to the rotary member, automatic means controlled by the reciprocatory movement of the head for locking and releasing the rotary member, and means for moving said member rotarily when the latter is unlocked.

3. In a combined drilling and reaming device, the combination of a reciprocatory head, a rotary member mounted on the head, a drill support and a reamer support, both mounted on the rotary member equal distances from the axis thereof, means for rotating said supports relatively to the rotary member, automatic means controlled by the reciprocatory movement of the head for locking and releasing the rotary member, means for moving said member rotarily when the latter is unlocked, and additional means for stopping the rotary movement of said member when the latter is released.

4. In a device of the character described, the combination of a reciprocatory head and a guide therefor, a disk rotatably mounted on the head, a pair of tool-supporting chucks rotatably mounted on the disk equal distances from the axis of said disk, driving means for rotating the chucks, and means for automatically locking and releasing the disk.

5. In a device of the character described, the combination of a reciprocatory head and a guide therefor, a disk rotatably mounted on the head, a pair of tool-supporting chucks rotatably mounted on the disk equal distances from the axis of said disk, driving means for rotating the chucks, means for automatically locking and releasing the disk, and means for transmitting rotary motion from a portion of said driving means to the disk when the latter is released.

6. In a device of the character described, the combination of a reciprocatory head, a guide therefor, a disk rotatably mounted on the head, tool-holding chucks rotatably mounted on the disk at equal distances from its axis, driving means for rotating said chucks in the same direction, additional means actuated by a part of said driving means for rotating the disk when released to interchange the position of the chucks, and means for locking said disk when the position of the chucks are interchanged.

7. In a device of the character described, the combination of a reciprocatory head, a disk rotatably mounted thereon, tool-holders rotatably mounted on the disk at equal distances from the axis thereof, driving means for said tool-holders, and means actuated by a part of the driving means for rotating the disk to successively present the tool-holders to the same position.

In witness whereof I have hereunto set my hand this 16th day of June, 1917.

WILLIAM H. TAMBS.

Witness:
H. E. CHASE.